US009326457B2

(12) United States Patent
Greeson

(10) Patent No.: US 9,326,457 B2
(45) Date of Patent: May 3, 2016

(54) MICRO LAYERING PEST CONTROL SOLUTION

(71) Applicant: John Greeson, Roswell, NM (US)

(72) Inventor: John Greeson, Roswell, NM (US)

(73) Assignee: DAIRY SOLUTIONS, INC, Roswell, NM (US)

( * ) Notice: Subject to any disclaimer, the term of this patent is extended or adjusted under 35 U.S.C. 154(b) by 326 days.

(21) Appl. No.: 13/859,069

(22) Filed: Apr. 9, 2013

(65) Prior Publication Data

US 2014/0299069 A1    Oct. 9, 2014

(51) Int. Cl.
*A01K 29/00* (2006.01)
*A01G 9/10* (2006.01)

(52) U.S. Cl.
CPC ...................................... *A01G 9/102* (2013.01)

(58) Field of Classification Search
CPC .................................................. A01K 13/003
USPC ......... 119/651, 650, 665, 656, 658, 666, 667, 119/669
See application file for complete search history.

(56) References Cited

U.S. PATENT DOCUMENTS

| | | | |
|---|---|---|---|
| 3,393,990 A * | 7/1968 | Geary ..................... | A01N 25/10 424/78.21 |
| 3,602,199 A | 8/1971 | Diggs | |
| 3,699,928 A | 10/1972 | Cowan | |
| 3,870,023 A | 3/1975 | Wilson | |
| 4,126,104 A | 11/1978 | Overby | |
| 4,334,504 A | 6/1982 | Matthews | |
| 4,533,254 A | 8/1985 | Cook et al. | |
| 4,614,300 A | 9/1986 | Falcoff | |
| 4,902,510 A * | 2/1990 | Garden ................... | A01N 25/02 424/405 |
| 5,063,880 A | 11/1991 | Bouthillier | |
| 5,104,659 A * | 4/1992 | Fishbein ................ | A01N 25/24 424/411 |
| 5,260,875 A | 11/1993 | Tofte et al. | |
| 5,482,369 A | 1/1996 | Verstallen | |
| 5,630,379 A | 5/1997 | Gerk et al. | |
| 5,785,004 A | 7/1998 | Hobbs | |
| 6,230,660 B1 | 5/2001 | Greeson | |
| 6,651,589 B2 | 11/2003 | Greeson | |
| 6,779,489 B2 | 8/2004 | Greeson | |
| 6,966,276 B2 | 11/2005 | Dollar | |
| 7,194,980 B2 | 3/2007 | Greeson | |
| 7,252,715 B2 | 8/2007 | Watts et al. | |
| 8,438,996 B2 * | 5/2013 | Greeson ............... | A01K 13/003 119/651 |
| 2003/0110101 A1 | 6/2003 | Friel et al. | |
| 2004/0047889 A1* | 3/2004 | Greeson ................. | A01N 25/02 424/405 |
| 2007/0257129 A1* | 11/2007 | Trompen ............. | A01K 11/001 239/44 |
| 2010/0319628 A1 | 12/2010 | Greeson | |

\* cited by examiner

*Primary Examiner* — Kristen C Hayes
*Assistant Examiner* — Ebony Evans
(74) *Attorney, Agent, or Firm* — Dennis F. Armijo

(57) ABSTRACT

A micro layering pest control system that includes combining generally immiscible ingredients in a container, maintaining the ingredients in a combined state by substantially continuously agitating and homogenizing the combined ingredients under pressure, and discharging the combined ingredients in one or more applications. The system further includes selecting an insecticide for controlling certain insects and selecting an oil, based on predetermined conditions, for mixing and applying to animals via the micro layering pest control system.

30 Claims, 5 Drawing Sheets

MICRO LAYERING PEST CONTROL SOLUTION

RELATED APPLICATIONS

This application is a continuation-in-part of U.S. patent application Ser. No. 12/487,702, entitled "Micro Layering Pest Control System", filed Jun. 19, 2009, the teachings of which are incorporated herein by reference.

FIELD OF TECHNOLOGY

The method and processes disclosed, illustrated, and claimed in this document pertain generally to controlling pests on animals. More particularly, the new and useful micro layering pest control solution of this document achieves a higher level of control over target insect pests at a much lower cost and volume of liquid that needs to be transported and handled

BACKGROUND

Control and management of posts has proven challenging, costly, illusive, and frequently ineffective. Pests of concern to dairy herdsman include (i) the conventional, classes of arthropods and related classes and orders known as muscoid and nonmuscoid (ii) arachnids, a class of mainly terrestrial arthropods comprising spiders, scorpions, mites, ticks, and the like; (iii) ectoparasites, which are parasites living on the surface of an animal; (iv) endoparasites, parasites living within an animal, and; (v) pathogens, viruses, bacteria, spores and similar agents of disease.

Left uncontrolled, pests have significant impact on the economics of animal production. The dairy cattle industry has been estimated to produce $38 billion annually in the United States. Uncontrolled flies, for example, may irritate cows so severely that milk production suffers; disease pathogens maybe transmitted; enteric (intestinal) diseases among humans associated with cow herds may increase; and a variety of regulatory rules and regulations may be violated.

Exemplary solutions for solving problems arising from pests among dairy herds were provided by the inventor named in this document in connection with U.S. Pat. No. 6,230,660 B2 issued May 15, 2001; U.S. Pat. No. 6,651,589 B2 issued Nov. 25, 2003; U.S. Pat. No. 6,779,489 B2 issued Aug. 24, 2004; and U.S. Pat. No. 7,194,980 B2, issued Mar. 27, 2007 (collectively, "Prior Patents").

The apparatus, systems and methods of the prior patents have achieved the level of pest control demanded by industry operators. They provide substantially automated control of pest populations on dairy cattle to an extent not possible before the evolution of varying solutions provided in the prior patents. The apparatus, systems and methods of the prior patents have become the most widely used pest control systems for large dairy herds in the United States. The apparatus of the prior patents are capable of consistently applying a moderately thick oil-based carrier containing at least one chemical (for example, an insecticide) and water, ingredients that may be finely misted onto cattle during operation, while allowing cattle to return to their pens after milking.

Industry operators; however, particularly those with large dairy herds, expressed a desire and need to be able to apply ingredients having significantly thicker oil-based carriers, with higher viscosities, containing one or more insecticides that on application to an animal such as a cow would neither be absorbed into the hair of the cow, nor dispersed on discharge of an application from a sprayer.

Another desire of the by dairy industry operators included the capability to increase the volume of ingredients applied during an individual application of ingredients on an animal. Certain combinations of ingredients combined within short periods of time during which the application is applied could, in some instances, result in sprays that were too fine. The direction of such fine sprays following emission from a sprayer could be altered by air currents occurring either inside or outside of a building in which the applications were applied to an animal (in this document, "dispersal" and/or "misting"). To overcome such problems, an operator might be required to apply more ingredients than would otherwise be needed for a particular objective in a pest control management plan, thus, increasing costs of operation. In addition, the effectiveness of an application might decrease or degrade the longer the time lapse between an earlier and a subsequent application.

Misting chemicals and/or oils may create a number of problems for both the dairy and the animals. Misting, chemicals and/or oils blown off target may create undesirably extensive and thick coatings of oil that may coat people, buildings, and surrounding structures and areas. Dairymen, who use oil-based chalk to mark and identify animals, are hindered if an animal's hide is excessively oily. The most desirable location for installing a pest control system for cattle is a location close to the entry of cattle into a barn or stall where cattle are milked. However, any misting oil containing insecticides could drift and contact milking equipment and milking personnel. In addition, the comparatively small orifice of sprayer nozzles require inclusion of fine mesh filters that clog, requiring frequent servicing and cleaning if misting is excessive.

Accordingly, it seemed desirable to develop a pest control system that would be capable of combining ingredients such as water, oil, and chemicals that tend to be immiscible, but combining them in such a way that their properties are unaltered as a result of the combining process, and that also would reduce dispersal and excess use of ingredients during a discharge or application of the ingredients on an animal.

However, a variety of problems presented obstacles for design and development of such a system. Heating the chemicals and/or oil prior to use, proved unsuccessful in overcoming the problems caused by misting. Trying to force high viscosity oils through a sprayer system proved ineffective. High internal pressures within tubing, hoses, and pumps associated with a spraying system, averaged 80-350 pounds per square inch ("psi"), creating premature wear and fatigue in sprayer components.

Other problems arose due to the physical and chemical properties of the ingredients themselves. For example, the thicker the oil, the faster it separates. Adding chemical emulsifiers to the combined water and oil proved ineffective due to the large volumes of water used on dairy cattle: large amounts of water remove oil and chemicals from an animal. Chemical emulsifying agents are affected by atmospheric moisture, which may be drawn into, and dilute the chemicals, and result in oxidization.

Other problems also became apparent. Injecting oil and water together at the tip of a nozzle on a sprayer is ineffective because injection rates vary significantly. Thick oil will alter injection pressure from 8,000 psi to approximately 100 psi during a temperature range variation from 40 to 110 degrees Fahrenheit, making installation and operation of pumps and associated equipment not only expensive, but also complicated and dangerous, on which to perform maintenance.

Injecting oil into lines containing water without agitating and recirculating the ingredients also proved ineffective because oil separates and floats to higher levels of mixed ingredients. Consequently, during spraying, the oil coagulates, causing uneven discharges from the sprayer on the animal.

As discussed in the prior patents, many other techniques for controlling pests on cattle have proven only marginal in achieving control of flies for long periods of time, including fogging; feeding cows oral larvicide; applying residual pesticides on the underside of shaders; larvicide spraying; back rubbers; and ear tags or other apparatus attachable to parts of an animal's body containing a liquid chemical or pesticide dispensable on an animal.

Accordingly, it would be of considerable advantage to provide a new and useful apparatus, method, and system for micro layering pest control applications of combined ingredients on an animal, which would be capable of achieving effective pest control. It would need to generally use immiscible ingredients whose properties would not change during the process of combining the ingredients, and resulting in reduced dispersal and reduced use of comparatively expensive ingredients during application of the ingredients on an animal's body.

There needs to be an optimized amount of chemicals or oil applied to the animals to avoid making the animals too oily, on one hand, and to avoid ineffective activity levels as the chemical ingredients degrade overtime due to ultra violet radiation, oxidation, and environmental degradation, on the other. The use of heavier and thicker oils increases the time that the chemicals will remain on an animal thus prolong the active ingredients decay time to levels that are ineffective to control the targeted pest and reduce the chances of making the animals to oily while reducing the time of spraying the animals. Thus, the presently claimed invention is designed to make full use of thicker oils and to decrees costs by increasing the percent by weight of pesticide actives.

SUMMARY

The claimed invention solves the problems addressed above and overcomes the shortcomings of the prior art.

A method and system is provided to select a ratio of a correct active insecticide and to optimize a thicker oil whereby "effective" chemical levels for both ingredients are exhausted at the same time at the same rate.

In one aspect, a method is provided for combining generally immiscible ingredients. The combined ingredients are maintained in a combined state by substantially continuously agitating the combined ingredients under pressure until the ingredients are substantially homogenized, without altering the properties of the combined ingredients. The combined ingredients may be applied in one or more applications.

In another method of controlling pests on an animal, ingredients for controlling the pests are combined under pressure in such a way that neither the physical nor the chemical properties of the ingredients are altered. The ingredients are substantially and continuously agitated under pressure, and subsequently applied on the animal in one or more successive micro layering applications.

In yet another aspect, a method of applying ingredients on an animal for pest control is provided that combines substantially immiscible ingredients under pressure in such a way that the physical and chemical properties of the ingredients are unaltered although agitated and circulated under pressure to achieve substantial homogenization of the ingredients. The agitated and circulated ingredients are applied to the animal in one or more successive micro layering applications in such a way that dispersal and excessive use of the ingredients are avoided.

In another aspect, an apparatus for controlling pests on an animal is provided. The apparatus includes means for combining generally immiscible ingredients. Means for maintaining the ingredients in a combined state also is provided. In addition, a device for applying the combined ingredients in one or more successive micro layering applications on the animal is included.

In still another aspect, a system for reducing dispersal and excessive use of ingredients during application of the ingredients on an animal is provided. The system includes an ingredient circulation mechanism for combining at least immiscible ingredients. A programmable controller is operatively connectable to the chemical and water recirculation device capable of receiving, storing, executing, and transmitting instructions related at least to substantially continuously agitating the ingredients in the ingredient circulation mechanism. A sprayer device is connected to the programmable controller for applying the combined ingredients to an animal during one or more micro layering applications.

In another aspect, a method of applying pest control ingredients on an animal is provided that minimizes dispersal and use of ingredients is provided, for providing a controller having, one or inure data processing systems having a set of computer instructions for collecting, storing processing and transmitting to a sensor a signal that an animal is in proximity of a sprayer capable of applying the ingredients on the animal. Also included in the controller is a set of computer instructions for controlling the combining of the ingredients under pressure in such a way that the properties of the ingredients remain unchanged after the combining. The controller is operatively connectable to a sprayer for applying the combined ingredients on the animal. The sprayer device discharges a micro layering application of the combined ingredients onto the animal.

As a result, micro layering achieves a number of technical advancements by overcoming the problems identified above.

For example, 4,000 Vis oil with 19 parts water combined to produce a treatment substance that may be sprayed or applied at the comparatively low pressure 25 psi. The ability to reduce system pressure to 25 psi permits a system operator to adjust droplet spray size, which in turn allows the operator to adjust the amount of treatment substance such as the chemical and/or water to be applied to an animal, while avoiding misting or related problems. Micro layering also permits the system operator to use sprayer tips that are large enough to avoid clogging.

The presently claimed invention matches the correct level of insecticide active with the correct carrier so that absorption, evaporation, oxidation, chemical breakdown of the active are liner to each other in a micro layer application, as described above.

Micro layering allows application of varying treatment substances more than once per day. Microlayering therefore increases the effectiveness of coverage of an animal by allowing cost effective and treatment effective multiple overlapping coverages.

The apparatus, systems and methods shown in this document have increased effectiveness of applications of ingredients by approximately 200% while at the same time both reducing use of expensive chemicals by approximately 70%, and substantially eliminating oil-misting problems.

It will become apparent to one skilled in the art that the claimed subject matter as a whole, including the structure of the apparatus, and the cooperation of the elements of the apparatus, combine to result in a number of unexpected advantages and utilities. The structure and co-operation of structure of the micro layering pest control system will become apparent to those skilled in the art when read in conjunction with the following description, drawing figures, and appended claims.

The foregoing has outlined broadly the more important features of the invention to better understand the detailed description that follows, and to better understand the contributions to the art. The micro layering pest control system is not limited in application to the details of construction, and to the arrangements of the components, provided in the following description or drawing figures, but is capable of other embodiments, and of being practiced and carried out in various ways. The phraseology and terminology employed in this disclosure are for purpose of description, and therefore should not be regarded as limiting. As those skilled in the art will appreciate, the conception on which this disclosure is based readily may be used as a basis for designing other structures, methods, and systems. The claims, therefore, include equivalent constructions. Further, the abstract associated with this disclosure is intended neither to define the micro layering pest control system, which is measured by the claims, nor intended to limit the scope of the claims. The novel features of the micro layering pest control system are best understood from the accompanying drawing, considered in connection with the accompanying description of the drawing, in which similar reference characters refer to similar parts.

Figure 1:
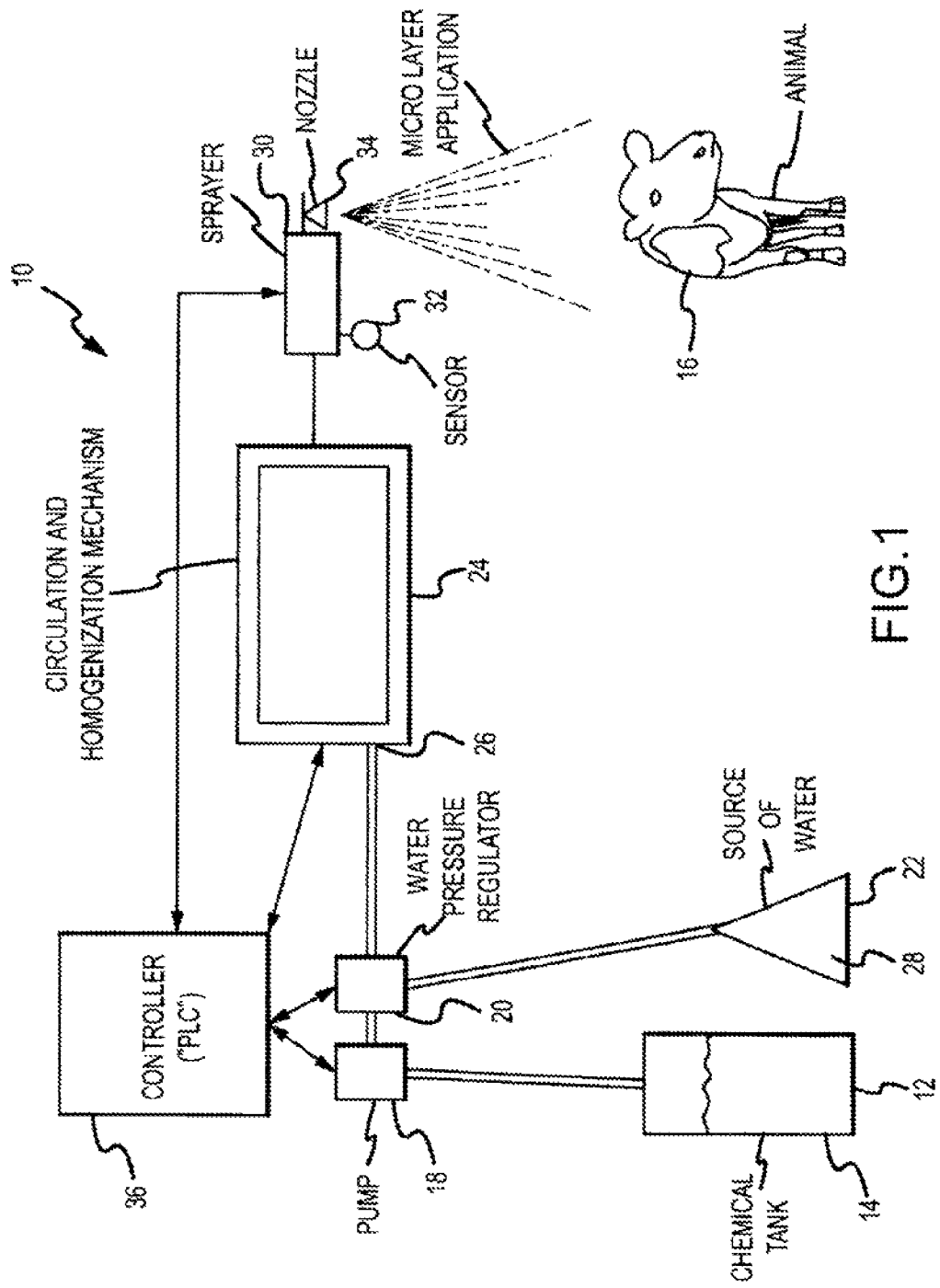
FIG. 1 is a schematic and diagrammatic view of the micro layering pest control system.

To the extent that the numerical designations in the drawing figures include lower case letters such as "a, b", such designations include multiple references, and the letter "n" in lower case such as "a-n" is intended to express a number of repetitions of the element designated by that numerical reference and subscripts.

DETAILED DESCRIPTION

Definitions

The term "pest" and/or "pests" as used in this document means pests of concern to dairy herdsman, and include (i) the conventional classes of arthropods and related classes and orders known as muscoid and nonmuscoid flies; (ii) arachnids, a class of mainly terrestrial arthropods comprising spiders, scorpions, mites, ticks, and the like; (iii) ectoparasites, which are parasites living on the surface of an animal; (iv) endoparasites, parasites living within an animal, and; (v) pathogens, viruses, bacteria, spores and similar agents of disease.

The term "effective" means application of a complete coverage of ingredients on an animal, while also reducing or eliminating use of excessive amounts of ingredients during application of the ingredients on an animal, including comparatively expensive ingredients such as chemicals and oils.

The term "ingredients" means at least water, a pesticide, an oil acting as a carrier for the pesticide, alternative chemicals, and other substances and compounds used for controlling pests on an animal. The related term "carrier-based ingredients" includes a variety of carriers such as oil, silicon, polymers, gels, and thickening agents that may be chemically inert.

The term "chemical" means as non-exclusive examples pyrethroids, organopolysiloxanes, organophosphates, and systemic endoparisites.

The term "treatment substance" means ingredients for application on an animal for treatment purposes after the ingredients have been combined as disclosed in this document.

The term "immiscible" means at least liquids that generally will not mix together to form a single homogeneous substance. As taught in this document, in the use and operation of the micro layering pest control system, the physical and chemical properties of ingredients that tend to be immiscible are not altered during a combination performed under pressure. As a result, on application of the ingredients on an animal, the ingredients perform the desired pest control.

The term "dispersal" means at least scattering, misting, and drifting of ingredients used to treat an animal when applied on an animal, including ingredients having a high evaporation rate.

The term "excessive use" means application of unnecessarily thick layers of ingredients on an animal body to achieve coverage of the animal.

The term "treatment" or "treating" of an animal such as cattle means at least control of pests.

The term "combining" means formation of a mixture, admixture, suspension, or homogenization of ingredients that in an uncombined state may have a propensity to separate, including water, chemicals including pesticides, viscous oils, ingredients not inherently soluble, and other ingredients.

The term "micro layering" means successive layers of ingredients applied to an animal in amounts consistent with a treatment plan and consistent with achieving one or more effective applications that may overlap a prior application of a micro layer of ingredients.

The term "controller" includes but is not limited to a microprocessor (such as an integrated circuit containing a central processing unit of a computer on one or more chips, such that only the memory and input-output functionalities need be added), but also includes any computer-related device that may be programmed with instructions to conduct a sequence of operations leading to discharge of ingredients from dispensers. The term "controller" therefore may include a computer, digital signal processor, including wireless technologies, and other equivalent devices.

The term "signal" includes but is not limited to a detectable physical quantity, pulse or impulse, such as a voltage, current, or magnetic field strength, as well as mechanical means for activation.

The term "activate" includes but is not limited to discharging one or more ingredients on an animal.

The term "animal" includes cattle, and thus both cows and steers, as well as other animals and mammals.

The term "exemplary" means serving as an example, instance, or illustration; any aspect described in this document as "exemplary" is not intended to mean preferred or advantageous over other aspects of the micro layering pest control system.

DESCRIPTION

As shown in FIGS. 1-5, a micro layering pest control system is provided that in its broadest context includes combining generally immiscible ingredients. The combined ingredients are maintained in a combined state by substantially continuously agitating the combined ingredients under pressure until the ingredients are substantially homogenized, without altering the properties of the combined ingredients. The combined ingredients are applied to an animal in one or more applications in desired quantities.

Figure 2:
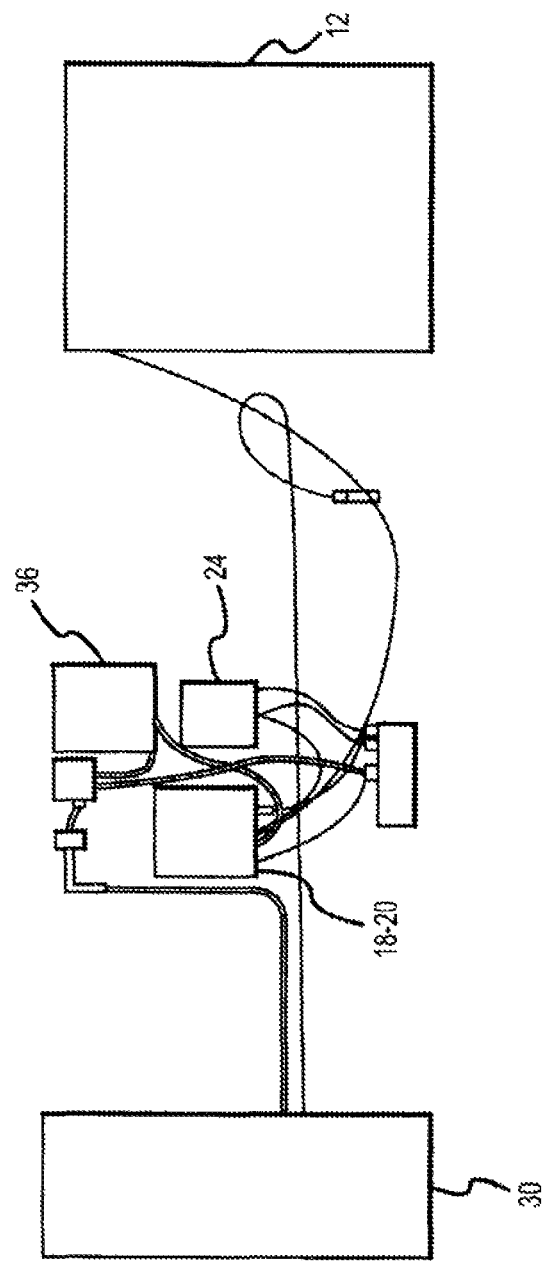
FIG. 2 is a perspective view of selected components of the micro layering pest control system in part mounted on a wall.

More specifically, referring initially by cross-reference between FIGS. 1-2, a micro layering pest control system 10 is shown to include a tank 12. Tank 12 is provided for holding at least one chemical 14. Non-exclusive examples of chemicals useful for pest control in connection with cattle are pyrethroids, organopolysiloxanes, organophosphates, and systemic endoparisites. As a person skilled in the art will appreciate, however, a number of alternative chemicals may be used for effective micro layering of animals for pest control. Chemical 14 held in tank 12 is but one ingredient that may be combined to be sprayed on an animal 16 from micro layering pest control system 10. Other ingredients may include water, a pesticide, oil acting as a carrier for the pesticide, alternative chemicals, and other substances and compounds used for controlling pests on an animal. Additional carriers include not only oil, but also silicon, polymers, gels, and thickening agents.

As also illustrated in FIG. 1, tank 12 is in fluid communication with a pump 18. The pump is an injection pump that injects chemical 14 from tank 12 with a regulated water stream that is produced by the combination of chemical 14 with water by a pressure regulator 20. As illustrated, pressure regulator 20 is in fluid communication with a source of water 22. Source of water 22 generally is available in a barn or similar enclosure in which cattle are held for purposes of applying the ingredients of micro layering pest control system 10 onto an animal 16 such as a cow.

Both injection pump 18 and water pressure regulator 20 are in fluid communication with an ingredient circulation mechanism 24, as also illustrated in FIG. 1. Ingredient recirculation mechanism 24 for combining the generally immiscible ingredients is a recirculation pump capable of inducing at least low pressure in a partial vacuum in the recirculation pump. Recirculation mechanism 24 is further capable of substantially homogenizing the generally immiscible ingredients.

In operation, ingredient circulation mechanism 24 circulates and recirculates ingredients injected into ingredient circulation mechanism 24 from injection pump 18 and water pressure regulator 20 at intake orifice 26 of ingredient circulation mechanism 24. By injecting both chemical 14 and water 28 into ingredient circulation mechanism 24 under pressure, a low pressure point is achieved, as low as 10 psi, at intake orifice 26. As ingredients from injection pump 18 and water pressure regulator 20 are injected into ingredient circulation mechanism 24, pressure may be adjusted within ingredient circulation mechanism 24. Pressure within ingredient circulation mechanism 24 may be adjusted, for example, to 40 psi. Ingredient circulation mechanism 24 circulates and recirculates the combined ingredients, allowing chemical 14 and water 28 to blend as part of the combining of ingredients, and to become substantially homogenized. The substantially homogenized ingredients are circulated and recirculated within ingredient circulation mechanism 24 until discharged onto an animal.

As also shown in FIG. 1, a sprayer 30 is provided. Sprayer 30 is in fluid communication with ingredient circulation mechanism 24. Sprayer 30 includes a sensor 32. Sensor 32 is used to detect the proximity and/or presence of an animal 16 in relation to the sprayer. In addition, sprayer 30 is equipped with at least one nozzle 34. Each nozzle 34 is capable of emitting one or more micro layer applications onto animal 16 as illustrated in FIG. 1.

As also illustrated by cross-reference between FIGS. 1-2, a controller 36 is provided. Controller 36 is provided for maintaining the ingredients in a combined state. Controller 36 is capable of receiving, storing, executing, and transmitting programmable instructions related to a number of functions. Controller 36 is operatively connected to injection pump 18, and is capable of transmitting instructions regarding at least the amount of chemical 14 to be transmitted to water pressure regulator 20, and the timing of injections. Controller 36 is also operatively connected to water pressure regulator 20, and is capable of transmitting instructions regarding at least the amount of water 28 to be drawn from water source 22 and injected into ingredient circulation mechanism 24 in combination with chemical 14 from injection pump 18. Controller 36 is also capable of transmitting instructions to water pressure regulator 20 regarding at least the water pressure adjustment desired for a desired pest control application.

Controller 36 is also operatively connected to ingredient circulation mechanism 24, and is capable of transmitting instructions regarding at least the pressure adjustment to make during operation of ingredient circulation mechanism 24 following injection of the ingredients from injection pump 18 and from water pressure regulator 20. Controller 36 is also capable of transmitting instructions to ingredient circulation mechanism 24 to substantially continuously agitate and homogenize the generally immiscible ingredients in ingredient circulation mechanism 24. Controller 36 also is capable of executing programmable instructions for selectively combining ingredients desired for one or more successive micro layering, applications on an animal 16.

Controller 36 also is operatively connected to sprayer 30, and is capable of transmitting instructions regarding at least the quantity and timing of the discharge of a micro layering application to an animal 16 in response to a signal from sensor 32 transmitted to controller 36.

As a person skilled in the art will appreciate, the explanation listed above about what controller 36 is capable of receiving, storing, executing, and transmitting are not limitations of micro layering pest control system 10 of this document. Controller 36 is capable of programming and re-programming to provide any number of steps and algorithms to achieve desired micro layering applications. Controller 36 may, for example, be programmed to achieve the technical advantage of combining ingredients that generally are immiscible in such a way that the properties of the respective ingredients following combination are unaltered, which in turn, produces an application of ingredients on an animal 16 that reduces dispersal and excessive use of ingredients during discharge or application of the ingredients on an animal 16.

Because controller 36 is operatively connectable at least to ingredient circulation mechanism 24, to injection pump 18, to water pressure regulator 20, and to sprayer 30, controller 36, on receipt of a sensor-activated signal from sensor 32 regarding the presence of an animal 16, is capable of discharging the combined and homogenized immiscible ingredients from nozzle 34 of the sprayer on animal 16.

Figure 3:
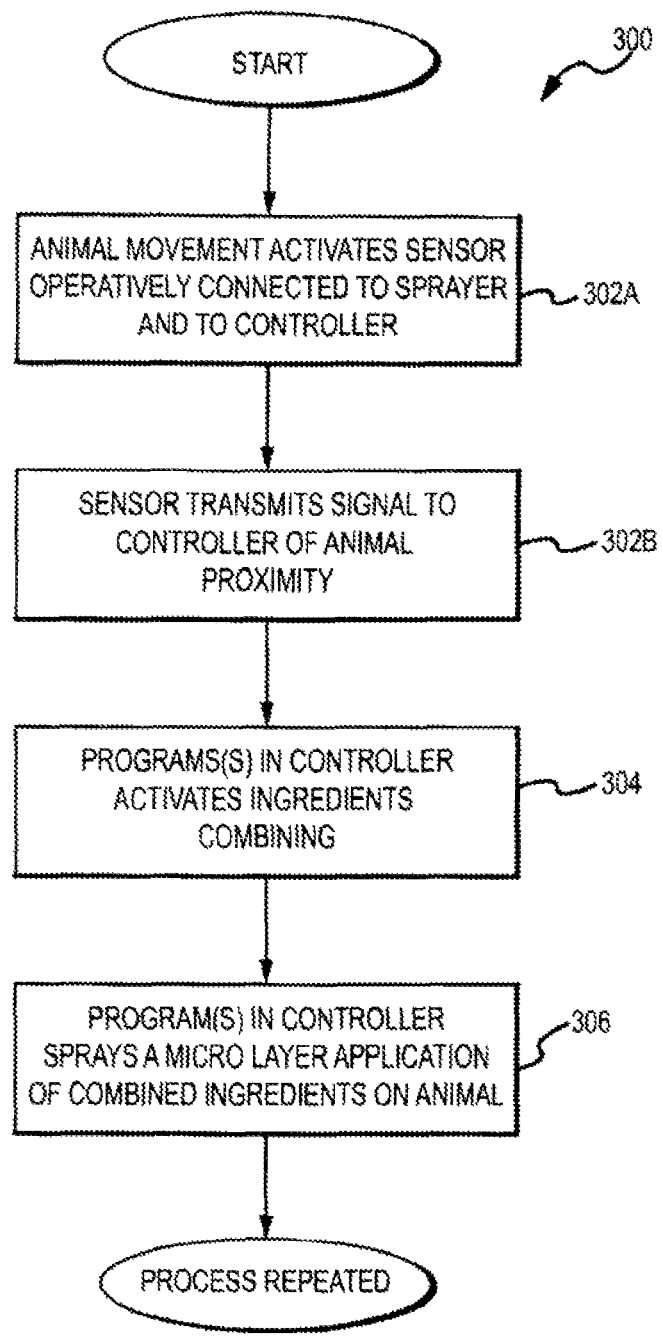
FIG. 3 is a flowchart of one aspect of operating the micro layering pest control system.

Referring now to FIG. 3, a method 300 of applying pest control ingredients on an animal that minimizes dispersal and use of ingredients is illustrated diagrammatically. As illustrated at block 302A-B, method 300 includes providing a controller having one or more data processing systems with a set of computer instructions for collecting, storing, processing and transmitting from a sensor a signal that an animal is in proximity of a sprayer capable of applying the ingredients on an animal. Block 304 illustrates that the controller includes a set of computer instructions for controlling the combining of the ingredients under pressure in such a way that the properties of the ingredients remain unchanged after the combining. As illustrated, the controller is operatively connected to a sprayer. In addition, the controller is operatively connected to an ingredient circulation mechanism in which the ingredients are combined. Block 306 illustrates that the controller may be activated to apply one or more micro layering applications of the combined ingredients onto the animal.

Figure 4:
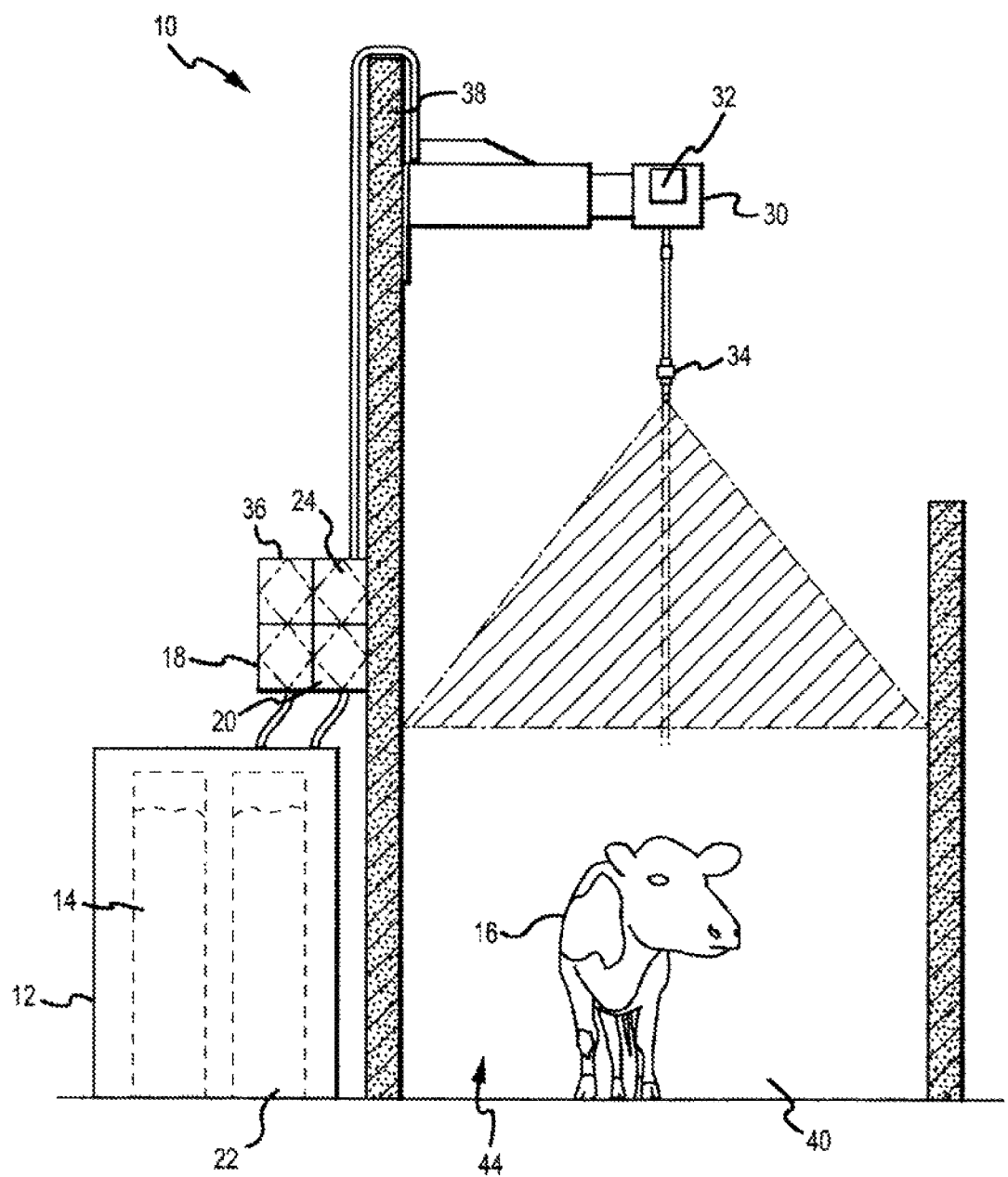
FIG. 4 is a perspective view of selected components of the micro layering pest control system.

Referring to FIG. 4, an arrangement of the component parts of the micro layering pest control system 10 is shown. FIG. 4 provides one illustration of the micro layering pest control system 10 in an operative environment. As illustrated, a substantially automated sprayer 30 is in fluid communication with one or more sources of ingredients 14, 22, a controller 36, a pump 18, a water pressure regulator 20, and an ingredient circulation mechanism 24.

An animal 16 such as a cow is shown moving beneath substantially automated sprayer 30. Automated sprayer 30 is shown mounted on a first wall 38 inside an enclosure 40 to enable animal 16 to pass beneath automated sprayer 30. A second wall 42 of enclosure 40 permits an operator of a dairy herd to direct an animal 16 such as a cow through an exit alley 44.

As also illustrated in FIG. 4, a tank 12 is provided for holding one or more ingredients such as a chemical. As will be evident to one skilled in the art, the one or more ingredients may be separated and held in one or more tanks or reservoirs. Tank 12 is shown to be in fluid communication with injection pump 18 and water pressure regulator 20, as well as in fluid communication with ingredient circulation mechanism 24. A nozzle 34 is also illustrated in FIG. 4. Substantially complete coverage of a micro layering application on an animal 16 is achievable by nozzle 34. A sensor 32 is provided for detecting animal 16. Continuing innovations in sensor technology afford selection of a variety of useful sensors in conjunction with sprayer 30, including through-beam sensors, retroreflective sensors, diffuse or proximity mode sensors, convergent beam sensors, ultrasonic sensors and the like.

At least one example of an ingredient circulation mechanism is manufactured by Standex, Procon Products, Murfreesboro, Tenn., as a canned motor pump model 7000 as a single phase pump with an inlet pressure of 100 psi; and at least one example of the pressure regulator is the water safety and flow control pump model 26A manufactured by Watts Regulator Company of North Andover, Me.; and at least one example of the pump in fluid communication with the tank for holding chemicals is a 300 Series OEM pump manufactured by Watson-Marlow, Inc., of Wilmington, Me. However, as a person skilled in the art will appreciate, none of those devices is a limitation of the micro layering pest control system of this document, and any number of alternative apparatus may achieve the unique functions of the method, apparatus and system disclosed in this document.

Prior to the micro layering concept of the parent patent, there was no method to place a micro layer of insecticide or pesticide on an animal. As indicated in the background art section, the state of the art consisted of "dipping" the animals, which was costly and inefficient. The insecticides work more efficiently if they are applied mostly to the hair of the animal and not to the skin. In order to increase the efficiency of the micro layering concept, an optimized solution for spraying is hereby provided.

Figure 5:
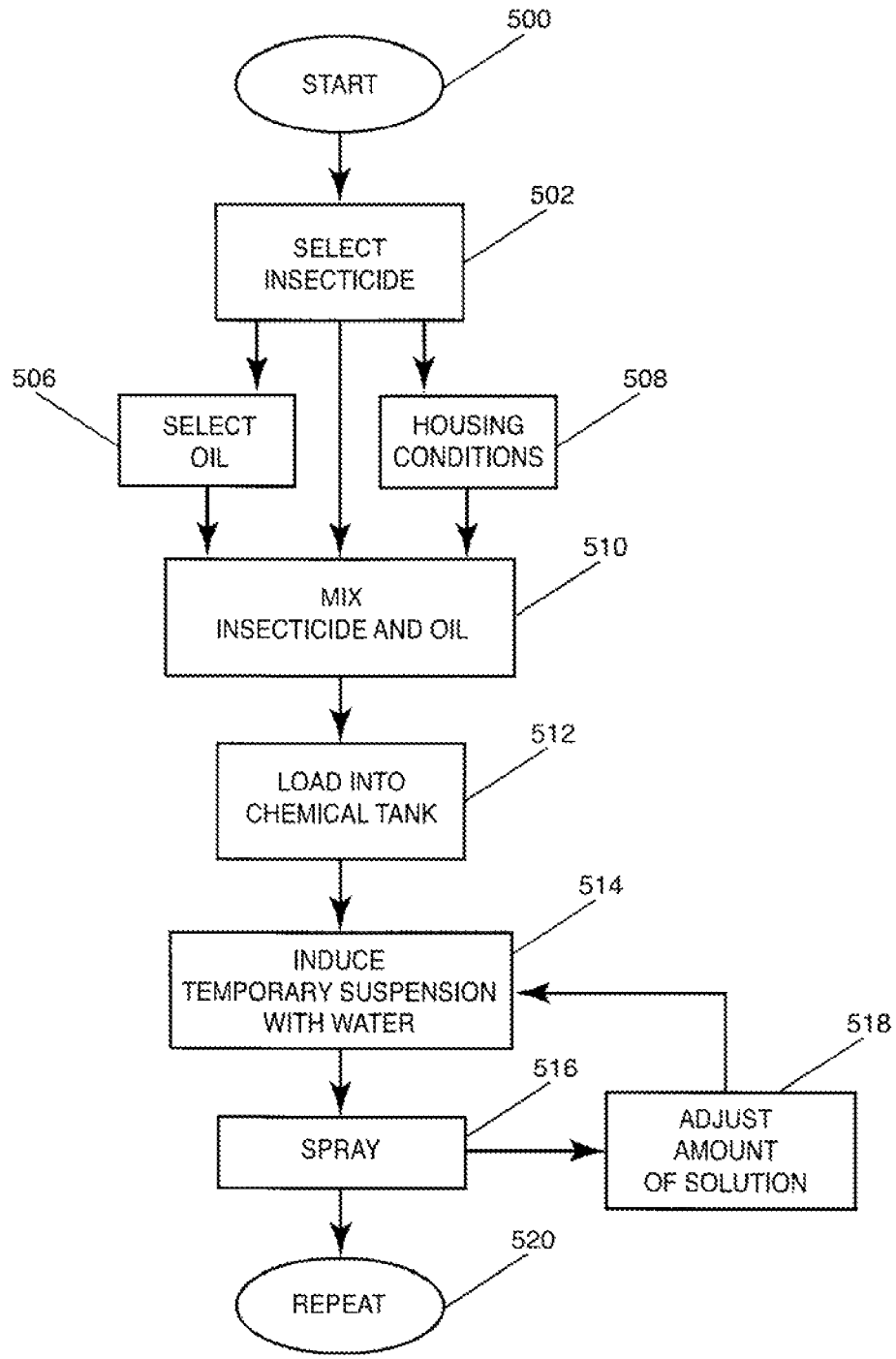
FIG. 5 is a flow chart depicting the steps for properly mixing a particular insecticide with an oil for optimal spraying applications.

The method to provide for the optimization of the solution is depicted in the flowchart of FIG. 5. First, a determination of the type of pests to be controlled and the resistance levels of the pest to be controlled must be determined. The process begins at start 500. From the aforementioned factors, a type of insecticide is determined 502. Below is a chart of an exemplary insecticide, permethrin, and its oil viscosity in Saybolt Seconds Universal (SSU), also known as Saybolt Universal Second (SUS), and percent of active by weight.

TABLE I

| Oil Viscosity and percent of active by weight | |
|---|---|
| 1-100 SSU .45% to 1.0% | Permethrin/PBO active |
| 101-300 SSU .45% to 1.50% | Permethrin/PBO active |
| 301-550 SSU 1.25% to 7.4% | Permethrin/PBO active |
| 551-1000 SSU 1.50% to 11.0% | Permethrin/PBO active |
| 1001-5000 SSU 2.0 to 22% | Permethrin/PBO active |

The rates for formulae over 5000 continue but the amount of active and product decrease to the point where the product is not very effective at repelling insects.

The above numbers are equivalent to other pyrythriods and insecticides used through the micro layering system to determine what percent of active to the viscosity needed.

Typically, no insecticide products are made with elevated viscosity because the goal is to get the product to the skin of the animal where it is protected from UV exposure and partially absorbs into the skin of the animal where it is absorbed and its life is extended.

The selection of the proper insecticide is based on several factors including, but not limited to the type of insects or pests, the absorption rates of the pesticide, which includes a selected insecticide or repellant, the evaporation rate and the time between spray applications. The next step is to select a carrier such as an oil 506 to mix with the pesticide. In prior art systems, increased viscosity is a negative as it makes the solution hard to apply. The optimal treatment is to treat animals quickly with a very thin fluid, thus the prior art systems blended the insecticide with very thin oils to make this process fast. The presently claimed invention is designed to operate opposite of the prior art by using a heavy thick oil or carrier. The selection of the oil 506 is based on several factors including but not limited to the absorption rate into the hair of the animal, the amount of dust and other particulates that the animal is exposed to and other relevant factors. Below is a chart of alkanes and the states for determination of one type of oil or carrier for mixing, but the formula could include any type non water soluble carrier agent compatible with the insecticide to be used. The mixed carrier and at least one pesticide comprise a mixed viscosity within the range of 1 through 450000 Saybolt Seconds Universal (SSU) with a residual rate of the active ingredient of fifty percent (50%) when exposed to ultraviolet rays (UV). Some ranges of the mixed viscosity include a residual rate of a range of a range of 1 SSU through 300 SSU for a period of time from 1 to 48 hours, a range of 200 SSU through 1100 SSU for a period of time of 6 to 72 hours, a range of 300 SSU through 1500 SSU for a period of time of 7 to 168 hours, a range of 550 SSU through 3500 SSU for a period of time of 12 to 336 hours, a range of 1100 SSU through 25,000 SSU for a period of time of 36 to 504 hours, and a range of 2500 SSU through 450,000 SSU for a period of time of 96 to 1008 hours. See rate chart below.

TABLE II

Alkane Formula Boiling point [° C.] Melting point [° C.] Density [g · cm−3] (at 20° C.)

| | | | | |
|---|---|---|---|---|
| Methane | $CH_4$ | −162 | −182 | gas |
| Ethane | $C_2H_6$ | −89 | −183 | gas |
| Propane | $C_3H_8$ | −42 | −188 | gas |
| Butane | $C_4H_{10}$ | 0 | −138 | gas |
| Pentane | $C_5H_{12}$ | 36 | −130 | 0.626 (liquid) |
| Hexane | $C_6H_{14}$ | 69 | −95 | 0.659 (liquid) |
| Heptane | $C_7H_{16}$ | 98 | −91 | 0.684 (liquid) |
| Octane | $C_8H_{18}$ | 126 | −57 | 0.703 (liquid) |
| Nonane | $C_9H_{20}$ | 151 | −54 | 0.718 (liquid) |
| Decane | $C_{10}H_{22}$ | 174 | −30 | 0.730 (liquid) |
| Undecane | $C_{11}H_{24}$ | 196 | −26 | 0.740 (liquid) |
| Dodecane | $C_{12}H_{26}$ | 216 | −10 | 0.749 (liquid) |
| Icosane | $C_{20}H_{42}$ | 343 | 37 | solid |
| Triacontane | $C_{30}H_{62}$ | 450 | 66 | solid |
| Tetracontane | $C_{40}H_{82}$ | 525 | 82 | solid |
| Pentacontane | $C_{50}H_{102}$ | 575 | 91 | solid |
| Hexacontane | $C_{60}H_{122}$ | 625 | 100 | solid |

The next step of the process in to determine the housing conditions 508 of the animals. This can include hut is not limited to whether the animals are inside a structure, whether the structure is climate controlled, whether the animals are in an open lot or other conditions.

After the aforementioned steps have been completed, the insecticide and oil are mixed 510. This can be done in any well know method, either in the chemical tank 12 of FIG. 1 or in a separate container and poured or loaded into the chemical tank 512 of the micro layering system. The optimal mixture is based upon absorption, evaporation, mitigation of over application and other relevant factors. In the discussion a single insecticide is discussed; however, it is intended for not only a single insecticide, but for mixtures of more than on insecticide.

For example, if a long lasting insecticide is required for an application, an insecticide with a half life of 2 days on animal hair is selected. For this example the mixture for the conditions can be:
2.7% Permethrin
2.7% PBO
1100 Viscosity SSU
Ambient temp 50-105 degree's F.

For a short duration application, a natural pyrethrum, which are unstable molecules that decay rapidly, can be used for the mixture for these conditions can be:
2% Pyrethrin (half life of about 30 mins degrades very quickly)
2% PBO
50 Viscosity SSU
Ambient Temp 50-105 degrees F.

The next step is to induce a temporary suspension with water 514 as previously described in reference to FIG. 1 in this document. The animal is then sprayed 516 with the mixed solution as also discussed above. The method is repeated 520 as necessary to control the insects or pests. The amount of the solution can be adjusted 518 for the next spray event depending on the remaining residues.

Claim elements and steps in this document have been numbered solely as an aid in understanding the description. The numbering is not intended to, and should not be considered as intending to, indicate the ordering of elements and steps in the claims. In addition, the micro layering pest control system showed in drawing FIGS. 1 through 5 shows at least one aspect of the micro layering pest control system that is not intended to be exclusive, but merely illustrative of the disclosed embodiments.

The invention claimed is:

1. A method of controlling pests on animals with a micro layering spray system or automated carrier based misting spray system, the method comprising the steps of:
    selecting at least one pesticide for the pests;
    selecting a carrier comprising a predetermined viscosity based on a concentration of an active level of the at least one pesticide, environmental conditions, toxicity, deterioration rates of active ingredients and an amount of time between spray applications, wherein the predetermined viscosity comprises a first predetermined Saybolt Seconds Universal (SSU) for short duration actives and a second predetermined Saybolt Seconds Universal (SSU) for long term actives wherein the first predetermined SSU is less than the second predetermined SSU;
    mixing the selected carrier and the at least one pesticide; and
    spraying the animal with the mixed carrier and the at least one pesticide.

2. The method of claim 1 wherein the mixed carrier and at least one pesticide comprise a mixed viscosity within the range of 1 through 450000 Saybolt Seconds Universal (SSU) with a residual rate of the active ingredient of fifty percent (50%) when exposed to ultraviolet rays (UV) and the environmental conditions.

3. The method of claim 2 wherein the mixed viscosity with the residual rate comprises a member from the group consisting of a range of 1 SSU through 300 SSU for a period of time from 1 to 48 hours, a range of 200 SSU through 1100 SSU for a period of time of 6 to 72 hours, a range of 300 SSU through 1500 SSU for a period of time of 7 to 168 hours, a range of 550 SSU through 3500 SSU for a period of time of 12 to 336 hours, a range of 1100 SSU through 25,000 SSU for a period of time of 36 to 504 hours, and a range of 2500 SSU through 450,000 SSU for a period of time of 96 to 1008 hours.

4. The method of claim 1 wherein the step of selecting comprises optimizing an amount of the active ingredients for controlling predetermined pests for a predetermined time period.

5. The method of claim 1 wherein the step of spraying comprises a topical follicle application.

6. The method of claim 1 wherein the step of selecting the carrier comprises selecting a liquid alkane.

7. The method of claim 1 wherein the step of selecting the carrier comprises selecting a non-water soluble carrier agent compatible with the at least one pesticide.

8. The method of claim 1 further comprising the step of adjusting the mixed carrier and at least one pesticide.

9. The method of claim 1 wherein the step of spraying comprises spraying more than once a week.

10. The method of claim 1 wherein the step of selecting the carrier is based on absorption rates of the at least one pesticide onto the animal to minimize adverse effects.

11. A method of controlling pests on animals with a micro layering spray system or automated carrier based misting spray system, the method comprising the steps of:
    selecting at least one pesticide for the pests;
    selecting an oil carrier comprising a predetermined viscosity based on a concentration of an active level of the at least one pesticide, environmental conditions, deterioration rates of active ingredients, an amount of time between spray applications, comprising determining an amount of active residue of the at least one pesticide and the selected oil carrier on tissue and milk and adjusting the viscosity accordingly;
    mixing the selected carrier and the at least one pesticide; and spraying the animal with the mixed oil carrier and the at least one pesticide.

12. The method of claim 11 wherein the mixed carrier and at least one pesticide comprise a mixed viscosity within the range of 1 through 450000 Saybolt Seconds Universal (SSU) with a residual rate of the active ingredient of fifty percent (50%) when exposed to ultraviolet rays (UV) and the environmental conditions.

13. The method of claim 12 wherein the mixed viscosity with the residual rate comprises a member from the group consisting of a range of 1 SSU through 300 SSU for a period of time from 1 to 48 hours, a range of 200 SSU through 1100 SSU for a period of time from 6 to 72 hours, a range of 300 SSU through 1500 SSU for a period of time from 7 to 168 hours, a range of 550 SSU through 3500 SSU for a period of time from 12 to 336 hours, a range of 1100 SSU through 25,000 SSU for a period of time from 36 to 504 hours, and a range of 2500 SSU through 450,000 SSU for a period of time from 96 to 1008 hours.

14. The method of claim 11 wherein the step of selecting comprises optimizing an amount of the active ingredients for controlling predetermined pests for a predetermined time period.

15. The method of claim 11 wherein the step of spraying comprises a topical follicle application.

16. The method of claim 11 wherein the step of selecting the carrier comprises selecting a liquid alkane.

17. The method of claim 11 wherein the step of selecting the carrier comprises selecting a non-water soluble carrier agent compatible with the at least one pesticide.

18. The method of claim 11 further comprising the step of adjusting the mixed carrier and at least one pesticide.

19. The method of claim 11 wherein the step of spraying comprises spraying more than once a week.

20. The method of claim 11 wherein the step of selecting the carrier is based on absorption rates of the at least one pesticide onto the animal to minimize adverse effects.

21. A method of controlling pests on animals with a micro layering spray system or automated carrier based misting spray system, the method comprising the steps of:
    selecting at least one pesticide for the pests;
    selecting a carrier comprising a predetermined viscosity based on a concentration of an active level of the at least one pesticide, environmental conditions, toxicity, deterioration rates of active ingredients and an amount of time between spray applications, wherein the step of selecting the at least one pesticide is based on an oxidation rate, ultraviolet (UV) deterioration rate, and environment deterioration rate of the at least one pesticide to make the rates linear with properties of the selected carrier;
    mixing the selected carrier and the at least one pesticide; and
    spraying the animal with the mixed oil carrier and the at least one pesticide.

22. The method of claim 21 wherein the mixed carrier and at least one pesticide comprise a mixed viscosity within the range of 1 through 450000 Saybolt Seconds Universal (SSU) with a residual rate of the active ingredient of fifty percent (50%) when exposed to ultraviolet rays (UV) and the environmental conditions.

23. The method of claim 22 wherein the mixed viscosity with the residual rate comprises a member from the group consisting of a range of 1 SSU through 300 SSU for a period of time from 1 to 48 hours, a range of 200 SSU through 1100 SSU for a period of time from 6 to 72 hours, a range of 300 SSU through 1500 SSU for a period of time from 7 to 168 hours, a range of 550 SSU through 3500 SSU for a period of time from 12 to 336 hours, a range of 1100 SSU through 25,000 SSU for a period of time from 36 to 504 hours, and a range of 2500 SSU through 450,000 SSU for a period of time from 96 to 1008 hours.

24. The method of claim 21 wherein the step of selecting comprises optimizing an amount of the active ingredients for controlling predetermined pests for a predetermined time period.

25. The method of claim 21 wherein the step of spraying comprises a topical follicle application.

26. The method of claim 21 wherein the step of selecting the carrier comprises selecting a liquid alkane.

27. The method of claim 21 wherein the step of selecting the carrier comprises selecting a non-water soluble carrier agent compatible with the at least one pesticide.

28. The method of claim 21 further comprising the step of adjusting the mixed carrier and at least one pesticide.

29. The method of claim 21 wherein the step of spraying comprises spraying more than once a week.

30. The method of claim 21 wherein the step of selecting the carrier is based on absorption rates of the at least one pesticide onto the animal to minimize adverse effects.

* * * * *